United States Patent [19]
Headley et al.

[11] Patent Number: 6,029,528
[45] Date of Patent: Feb. 29, 2000

[54] EARRING FORCE TESTER

[75] Inventors: Robert B. Headley, Yorktown Heights; Raymond H. Puffer, Jr., Watervliet; William H. Finger, Huntington Station, all of N.Y.; Thomas P. Bonkenburg, York, Pa.; Brian R. Tibbetts, Stephentown, N.Y.

[73] Assignee: Tiffany and Company, New York, N.Y.

[21] Appl. No.: 09/135,297

[22] Filed: Aug. 17, 1998

[51] Int. Cl.⁷ .................................................... G01L 1/00
[52] U.S. Cl. ..................................................... 73/862.541
[58] Field of Search ................. 73/862.01, 862.541, 73/862.621, 862.53, 862.381

[56] References Cited

U.S. PATENT DOCUMENTS

| | | | |
|---|---|---|---|
| 1,855,573 | 4/1932 | Haber | 73/379.03 |
| 2,461,691 | 2/1949 | Lynn . | |
| 3,759,092 | 9/1973 | Fishel | 73/862.541 |
| 3,766,777 | 10/1973 | Roveti | 73/862.01 |
| 3,785,381 | 1/1974 | Lower et al. | 73/862.541 X |
| 3,897,680 | 8/1975 | Grundmann et al. . | |
| 4,066,082 | 1/1978 | Arcan et al. . | |
| 4,254,676 | 3/1981 | Wilson | 73/862.541 X |
| 4,489,619 | 12/1984 | Steinberger . | |
| 4,674,330 | 6/1987 | Ellis | 73/379.03 |
| 4,776,608 | 10/1988 | Caillat et al. | 73/862.541 X |
| 5,076,106 | 12/1991 | Buddwalk | 73/862.541 |
| 5,125,270 | 6/1992 | Kovacevic | 73/379.02 |
| 5,174,154 | 12/1992 | Edwards | 73/379.02 |
| 5,341,688 | 8/1994 | Morikawa . | |
| 5,467,656 | 11/1995 | Teare et al. | 73/862.541 |

FOREIGN PATENT DOCUMENTS 2110333  4/1990  Japan .

OTHER PUBLICATIONS

UniForce Technical Notes # 101, Force Imaging Technologies, Chicago, Illinois, Jul. 1995, 4 pages.

*Primary Examiner*—Benjamin R. Fuller
*Assistant Examiner*—Jewel V. Thompson
*Attorney, Agent, or Firm*—Peter J. Phillips

[57] ABSTRACT

An earring force tester for clip-on type earrings detects the spring force of an earring and provides a visual output signal including whether the spring force is above (too tight), below (too loose) or within an acceptable range of force. The output signals are different colored LEDs. The lower and upper boundaries of the range can be adjusted such as to calibrate the device.

17 Claims, 4 Drawing Sheets

EARRING FORCE TESTER

BACKGROUND OF THE INVENTION

The present invention relates to an earring tester, for testing the spring force of clip-on type earrings, including hybrid type earrings having a clip-on portion.

One type of earring available in the market are clip-on type, which are spring loaded to hold the earring onto the ear lobe. Sometimes the spring force is too tight, resulting in pain or discomfort to the wearer. Sometimes the spring force is too loose so that the wearer risks losing them. Optimally, the spring force should not be too tight to cause pain or discomfort, yet not too loose to create a risk of falling off.

In retail stores which sell such earrings, a customer may be the first person to notice whether the earrings are too tight or too loose. The earrings may need to be adjusted by a jeweler, often requiring additional waiting by the customer, and increasing the time for the sales clerk to consummate the sale, who typically carries the earrings to the jeweler for adjustment. Not only does this require extra time from the customer, sales clerk and jeweler, it also impacts the image and quality control of the retail store.

SUMMARY OF THE INVENTION

It is an object of the present invention to provide an earring force tester to test the spring force of clip-on type earrings.

It is an object of the present invention to provide an earring force tester to test the spring force of clip-on type earrings to provide an indication of whether the spring force is in an acceptable range which is not too tight or too loose.

It is an object of the present invention to provide an earring force tester to test the spring force of clip-on type earrings to provide an indication of whether the spring force is too loose, or is too tight, if it is not in an acceptable range, so that the proper adjustment can be made in the earring.

It is an object of the present invention to provide an earring force tester which provides a simple, easy way to interpret an indication of whether the earring force is within an acceptable range so as not to require subjective interpretation by an operator.

It is an object of the present invention to provide an earring force tester in which the indication of whether the earring force is in an acceptable range is provided visually by the lighting of a light.

It is an object of the present invention to provide an earring force tester which is portable and capable of being hand-held.

It is an object of the present invention to provide an objective indication of the spring force of clip-on earrings in a simple, easy-to-use device requiring little training or instruction.

It is an object of the present invention to provide an earring force tester in which the lower and upper boundaries of the acceptable range of earring force can be calibrated by the user.

It is an object of the present invention to provide an earring force tester in which the lower and upper boundaries of the acceptable range of earring force can be adjusted by the user.

It is an object of the present invention to provide an earring force tester which may be run on AC or battery power, and when run on battery power provides an indication of the battery power becoming weak.

In accordance with the present invention, an earring force tester is provided, comprising a force sensitive member to which a spring loaded clip-on type earring can be mounted, and a detection circuit responsive to the force sensitive member for providing an indication of whether the spring force is within a range of acceptable spring force values.

Other objects, advantages and features of the present invention will appear from the following detailed description, claims and drawings.

DETAILED DESCRIPTION OF THE PREFERRED EMBODIMENTS

Two embodiments of an earring force tester according to the present invention will be shown and described as examples. However, the present invention is not limited to these two embodiments. As used herein, the term clip-on earrings includes hybrid or clip and post earrings having a clip-on portion.

Figure 1:
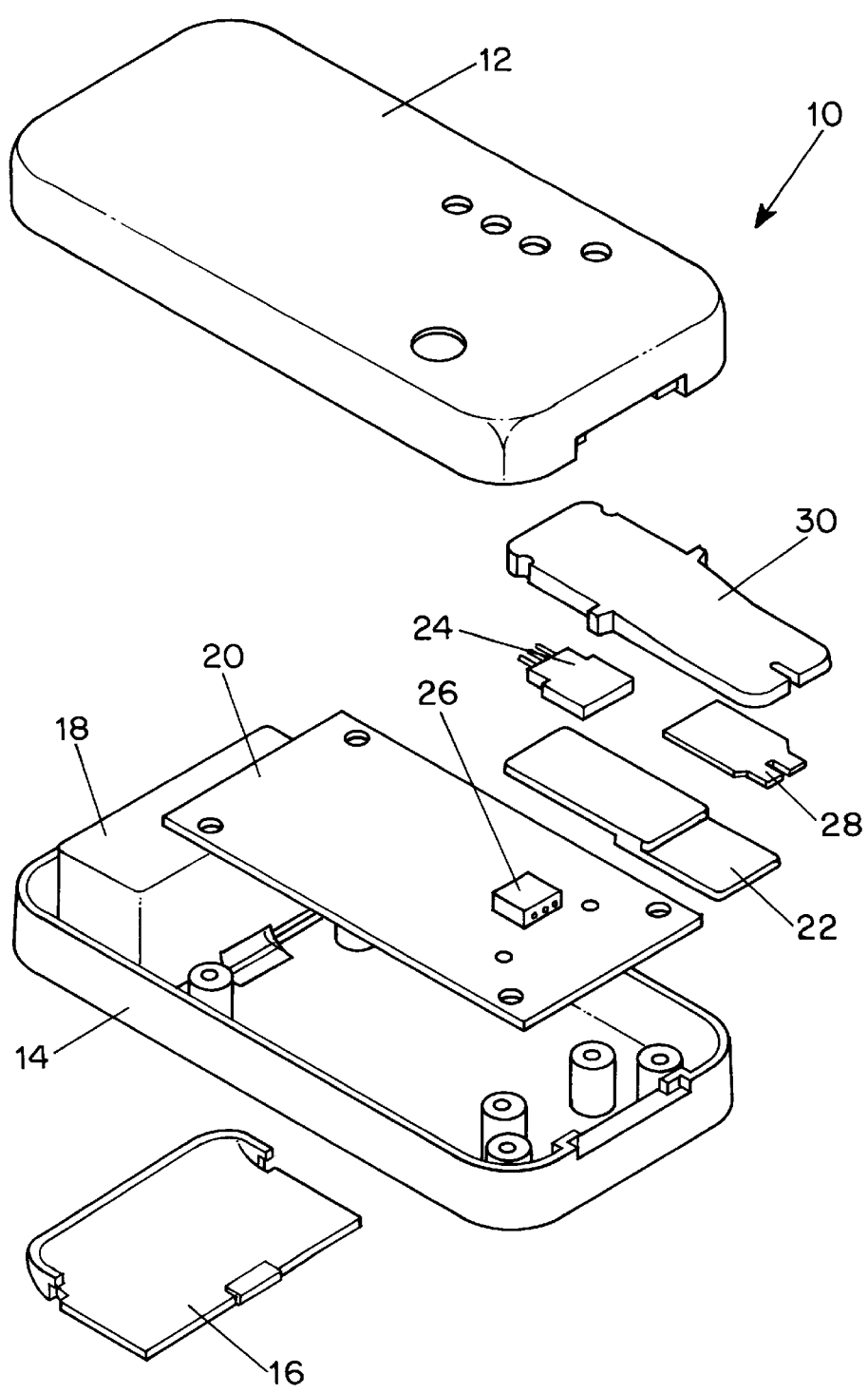
FIG. 1 is a perspective view, in exploded form, of various components of an earring force tester according to the invention.

FIG. 1 shows an exploded view of the mechanical components of an earring force tester 10. The tester comprises an outer housing having a top housing portion 12, a bottom housing portion 14, a removable battery cover 16 for a battery compartment 18 in the bottom housing portion, a circuit board 20 which carries the electrical circuit, a connector cover 22, a sensor connector 24 which connects to a connector 26 on the circuit board, a sensor cover 28 which houses the force sensor and a sensor bar 30 which provides rigidity and strength for the assembly. The sensor cover 28 and sensor bar 30 have a slot which allows for the post on hybrid type earrings to be inserted.

The force sensor used is a device having two or more electrical leads having an electrical impedance between those leads which varies in dependence on the force applied to the sensor. When no load is present, the resistance is high. As force is applied the resistance decreases in relationship to the amount of force applied, on a real time basis. An example of a force sensor that may be used is sold under the model name UNIFORCE™ and is available from Force Imaging Technologies in Chicago, Ill.

When the assembly of FIG. 1 is connected together, the top and bottom housing portions are connected together and a portion of the sensor connector, sensor cover and connector cover protrude from the housing to provide a sensing region onto which earrings can be mounted for testing.

The top housing portion has a plurality of holes for allowing visual access to LEDs mounted on the circuit board when the top and bottom housing portions are mated. When assembled, the complete housing provides a convenient hand held portable device that is light and easy to use. As will be described below, the LEDs indicate whether the earring force is too loose, too tight, or within the acceptable range, as well as providing an indication of whether the unit is switched on and whether the battery voltage becomes weak.

Figure 2:
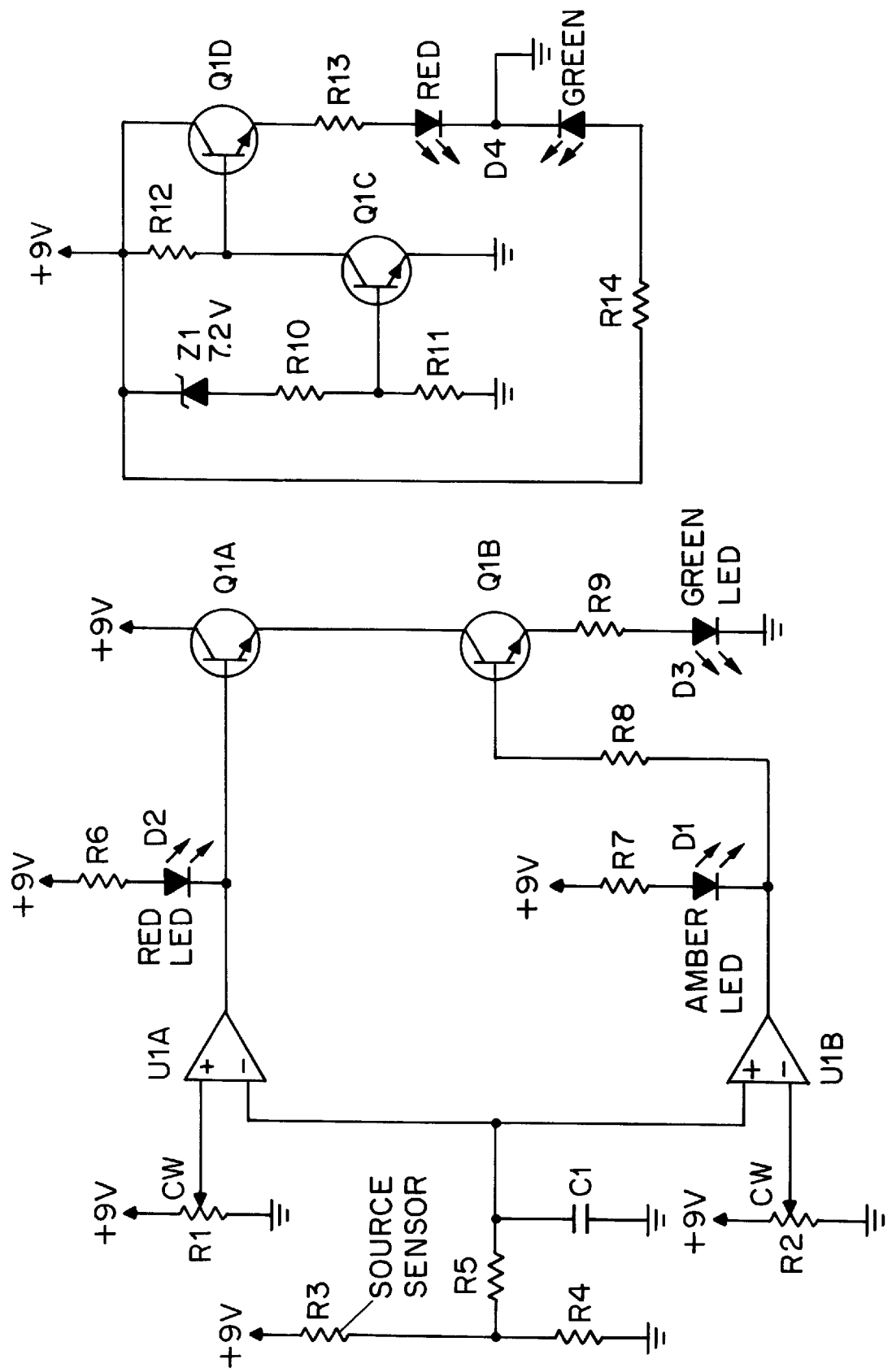
FIG. 2 is a circuit diagram of a circuit used in a first embodiment of an earring force tester according to the invention.

FIG. 2 is an electrical schematic of a circuit according to one embodiment of the invention. The circuit operates with a 9V battery as a power source. The circuit consists of two main subcircuits, a sensor interface subcircuit and a low-voltage detector subcircuit.

The input to the sensor interface subcircuit is the sensor shown as R3. The sensor is a two pin, variable resistor, as described above. The resistance is high (>1M) for no force and reduces substantially and non-linearly as force is applied to the sensor. A voltage divider is constructed with the sensor R3 and resistor R4. The voltage at the common node of this divider is indicative of the force. The voltage is less than 1V if there is no force and near 9V if there is high force. This voltage is passed through a light noise filter consisting of resistor R5 and capacitor C1 and is the input to a bank of comparators, U1A and U1B. Comparator U1A detects when the force is above a high threshold and U1B detects when the force is below a low threshold. Both thresholds are established by user-settable trim potentiometers R1 and R2. If the voltage from the divider network is above the voltage set by R1, the output of U1A goes to ground. This action completes a circuit through R6 and red LED D2 to light this LED, indicating high force. At the same time, this action results in Q1A being shut off. If the voltage from the divider is less than the threshold, D2 is not lit and Q1A is turned on. The functioning of U1B and amber LED D1 is similar with opposite trigger conditions, indicating when the force is below the low threshold.

In the event that the divider voltage is below the voltage from R1 and above the voltage from R2, both amber LED D1 and red LED D2 will be off and both Q1A and Q1B will be on. This condition results in green LED D3 being lit, indicating that the force from the earring is in an acceptable force range. If either D1 or D2 is lit, the corresponding transistor Q1A or Q1B will be off, preventing D3 from being lit.

The low-voltage subcircuit circuit provides both a power-on indicator and a low-voltage indicator. When power is applied to the circuit, voltage is applied to green diode in the bi-LED D4 via R14. Detection of low voltage is accomplished with Zener diode Z1 and resistors R10 and R11. If the voltage is approximately 9V, the voltage at the cathode of Z1 is 1.8V. Thus, the base voltage of Q1C reaches a turn on state which turns off Q1D and prevents the red LED of D4 from being lit. When the battery voltage falls below 8.6V, the Z1 cathode is below 1.4V and the base of Q1C is below its turn-on threshold. As a result, Q1D is turned on and the red LED of D4 is lit, denoting low voltage. In summary, the green LED of D4 is lit when the battery voltage is at or above 8.6V, and the red LED of D4 is lit when the battery voltage falls below 8.6V.

The circuit of the above described embodiment provides a functioning circuit with a relatively small number of components. However, the high voltage applied to the sensor R3 may result in unacceptable drift in sensing indications. Also, variation in the actual voltage level may modify the threshold values.

Further, portions of the circuit may consume more power than acceptable for some situations.

Figure 3A:
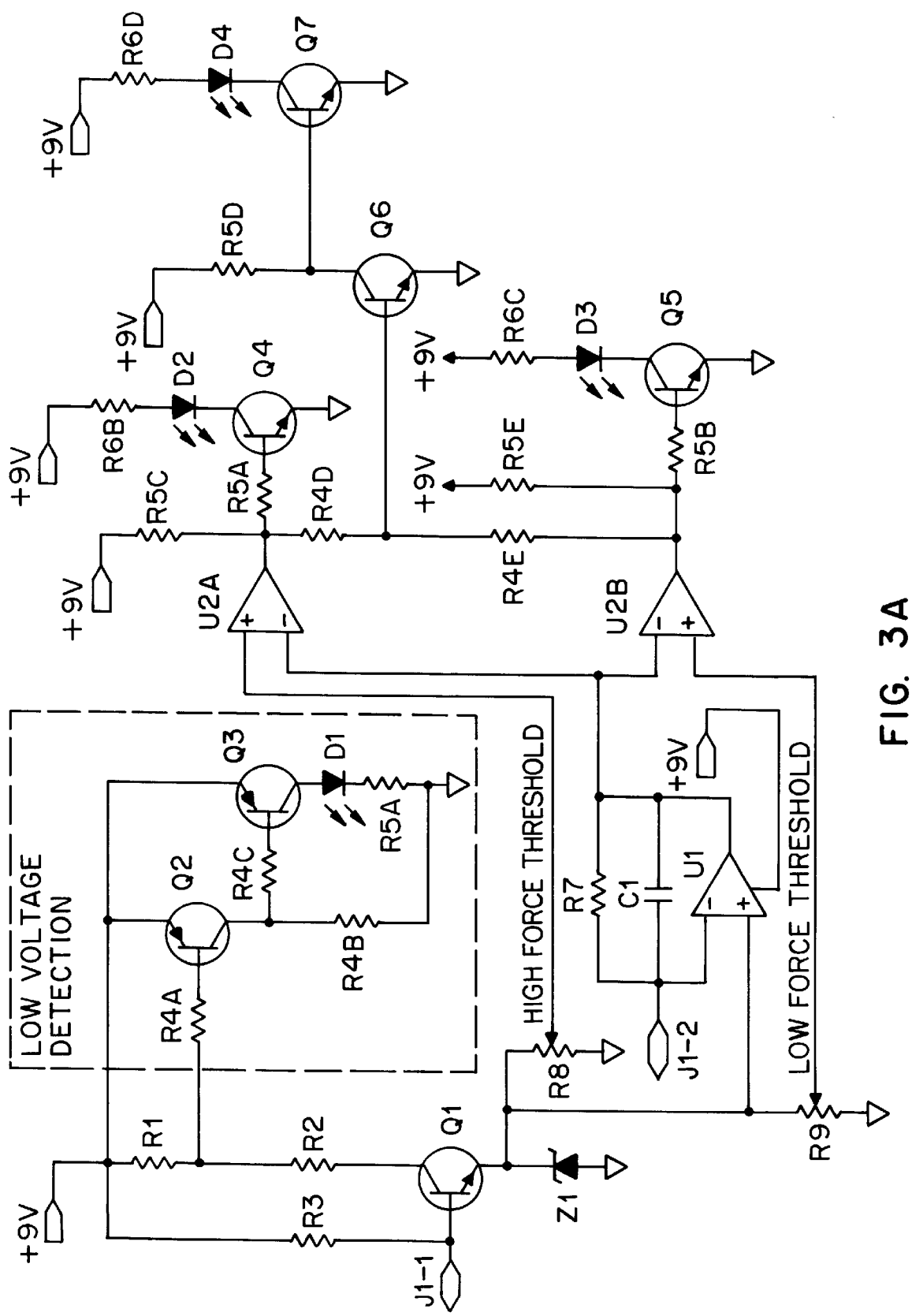
FIGS. 3A and 3B comprise a circuit diagram of a circuit used in a second embodiment of an earring force tester according to the invention.
Figure 3B:
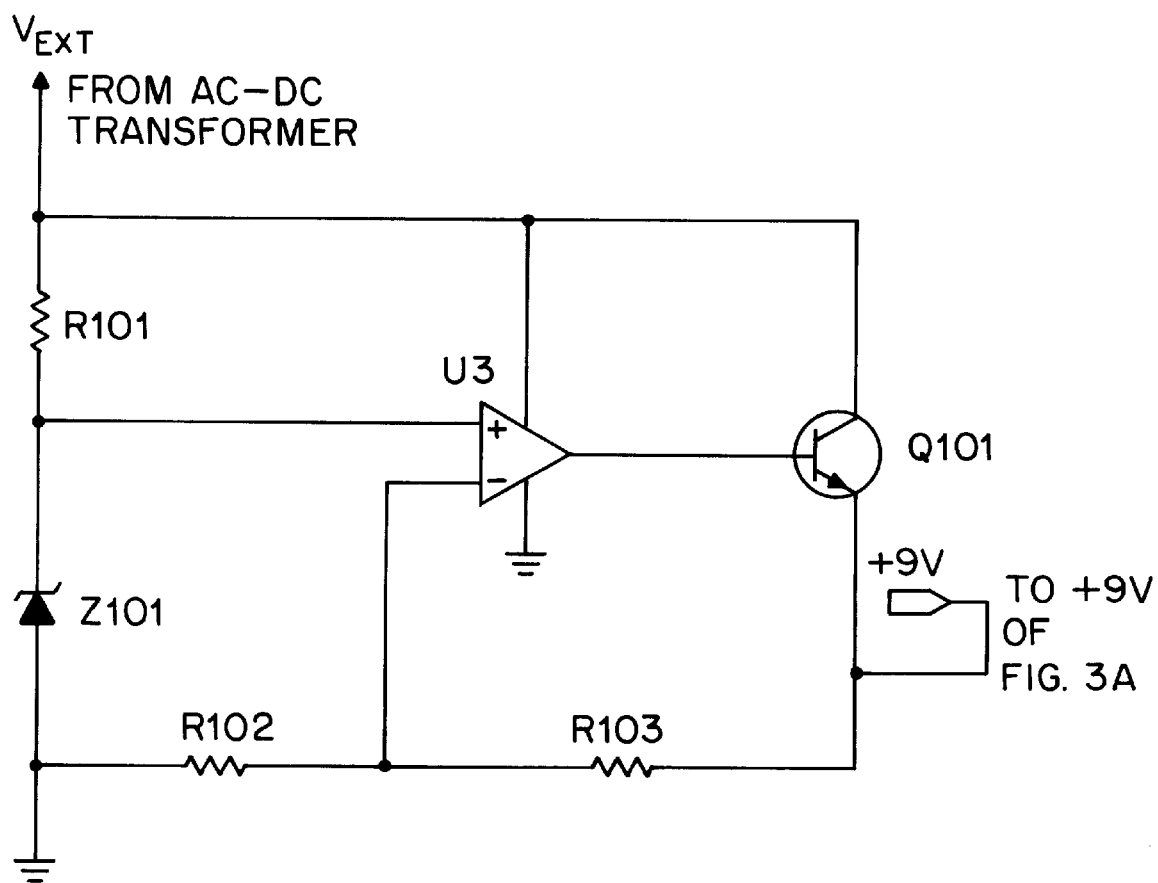

FIG. 3A and FIG. 3B show another embodiment of a circuit which provides improved circuit operation relative to that of FIG. 2 under many circumstances.

The circuit of this embodiment operates on either a 9 Volt battery or a DC power supply of at least 10.5V. This circuit consists of three major subcircuits: a sensor interface subcircuit, a low-voltage detector subcircuit, and a voltage conditioning subcircuit.

The sensor subcircuit and low voltage subcircuit share a common circuit. This common circuit provides a standard reference for all comparisons and thresholds throughout the interface circuit, an appropriate voltage level for the force sensor, and a low voltage threshold. This common unit is formed by resistors R1, R2 and R3, Zener diode Z1, and transistor Q1. The same functionality could be achieved by replacing R3 and Q1 with a diode.

Zener diode Z1 provides a constant reference for the various uses within the interface circuit. While this value was chosen to be 4.3V, other values are suitable. The combined resistance of R1 and R2 is set sufficiently low so the resulting current will properly drive Z1 (low current will result in variation of the Zener voltage $V_z$). R3 is used to turn on Q1. One lead of the force sensor is shown at J1-1 and is connected to the base of Q1 and the other lead is J1-2 at the Zener voltage $V_z$ of the Z1 reference. This results in the voltage across the sensor always being less than the 1V recommended by the sensor manufacturer.

The operation of the common circuit provides that the voltage of the Q1 collector will always be approximately 4.4V. Therefore, the voltage across the R1-R2 divider is the input voltage less 4.4V. The ratio of R1 to R2 is chosen so that the low voltage condition will cause the voltage drop across R1 to be approximately 0.7V (at input voltages below this condition, the R1 voltage drop is less than 0.7V).

The low voltage detection subcircuit uses R1, pin#1 to detect low voltage. When there is a sufficiently high voltage, the voltage drop across R1 is greater than 0.7V and Q2 is in saturation ($V_{be}$=−0.7V). Thus, the voltage at the Q2 collector is within 0.2V of the input power voltage and Q3 is off. Therefore, no voltage is provided to D1 (the low voltage indicator is off). If the voltage drop across R1 is less than 0.7V, Q2 turns off. Thus, R4B causes $V_{be}$ of Q3 to be approximately −0.7V and Q3 turns on. Red LED D1 is then lit, indicating a low voltage condition.

The interface subcircuit consists of an initial signal conditioning circuit and the detection circuits. The initial signal conditioning is an inverting amplifier provided by an op-amp U1, a feedback resistor R7, and an input resistor which is the force sensor having one terminal indicated at J1-2. In this design, a light noise filter is provided by the combination of R7 and C1. This filter is not required. This amplifier is applied to a constant voltage, $V_{be}$ of Q1. The variation of the force sensor resistance, due to a change of force applied to the force sensor, changes the gain of the amplifier and, therefore, the voltage at U1, pin#6. The characteristic of the force-resistance curve is such that this circuit configuration produces a substantially linear response between force on the sensor and voltage at U1, pin#6. Also, the voltage at U1, pin#6, is between the Zener voltage of Z1 and ground. Under a no force condition, the gain of the inverting amplifier is low and the output voltage is close to the Zener voltage $V_z$. Under a high force condition, the gain is high and output voltage is much less than $V_z$ of Z1. For a particular design, the sensitivity is governed by the choice of R7 and the range is governed by the choice of $V_z$ of Z1. The output limitation of the op-amp on the negative rail provides a hard limit on the range.

The detection circuit uses two comparators, U2A and U2B. These comparators work on the voltage at U1, pin#G and thresholds set by R8 and R9 trim potentiometers. Since the voltage at U1, pin#6 is always between the Zener voltage of Z1 and ground, the voltage rails of the trimmers were also set to $V_z$ and ground. The driving voltage of the force sensor (set by $V_{be}$ of Q1) and the Zener voltage of Z1 are the only voltages which can change the detection results. These voltages are not substantially effected by changes in input power voltages. If the output voltage is greater than R9, pin#2, U2B is open (indicating low force). If the output voltage is not greater than the voltage at pin#2 of R9, U2B is at ground. If the output voltage is less that R8, pin#2, U2A is open (indicating high force). Otherwise, U2A is at ground.

The low force amber LED D3 is lit if U2B is open since R5E can turn on Q5. Otherwise, U2B is at ground, Q5 is off and D3 does not light. The combination of U2A, D2, Q4, and R5C operates in an analogous manner for the high force condition, so that red LED D2 is lit if a high force condition exists. If both U2A and U2B are at ground, Q6 is off and the collector of Q6 is high, turning on and causing the nominal force green LED D4 to light. If either U2A or U2B are open, Q6 is turned on which turns off Q7. Thus, acceptable force indicator D3 can light only if both the low and high force indicators D1 and D2 are off.

The voltage conditioning circuit is only required for a DC power source which runs substantially above the 9V level. A non-inverting amplifier formed of U3, R102, R103 with a transistor output stage Q101 is used to provide a 9V supply to the detection circuit. The Zener voltage of Z101 is used to establish a reference and R102 and R103 are set so that: 9V=(1+R103/R102)*$V_z$. R101 is chosen so that there is adequate current for Z101.

A switching power plug is used so that power is either drawn from the 9V battery or from the external supply. If an external supply is chosen which is close to 9V output, this power conditioning circuit need not be used. A power switch (not shown) can be located between the power source and remainder of the circuit, so that the device can be turned off by the user to save power when not being used.

The threshold setting potentiometers can be set by the user using earrings or other devices having a known force. Examples of acceptable limits are 100 grams for the low threshold and 200 grams for the high threshold, to provide an acceptable force range of 100–200 grams. As used herein, the term "acceptable range" means a range having a lower boundary and an upper boundary, the lower boundary being sufficient to keep an earring from falling off, and the upper boundary being above the lower boundary and being below a force which causes pain or discomfort to a wearer. The values of the upper and lower boundaries may vary from one earring design to another depending on such things as size and weight of the earring, and clasp design.

To operate the earring tester, the user turns on the power switch which connects the power supply or battery to the circuit. The power indicator should activate, as well as the amber LED, indicating low force, assuming no earring is attached to the sensor. An earring to be tested can then be placed on the sensor bar. The circuit determines whether the force exerted by the earring is too loose (amber LED lights), too tight (red LED lights) or acceptable (green LED lights). The unit can be calibrated using known force earrings or other devices as described above, by placing an earring or device having, for example, 100 grams force and adjusting the low force threshold so the green LED just starts to light. A similar calibration may be done with a 200 grams known force device for the high threshold. Of course the device may be calibrated or adjusted using other force values.

Instead of, or in addition to, the LEDs or other visual indicating means, an audio sound generator can be provided which would produce one or more distinct tones or sounds when the earring is too loose, too tight or within the range.

The tables following this section list the values of circuit components of the preferred embodiments.

While two preferred embodiments have been shown and described, numerous variations and modifications will readily occur to those skilled in the art. The invention is not limited to the preferred embodiments, and its scope is defined by the appended claims.

Table For FIG. 2

| | |
|---|---|
| R1 | 2K |
| R2 | 2K |
| R3 | Force Sensor |
| R4 | 100K |
| R5 | 100K |
| R6 | 750 |
| R7 | 2.2K |
| R8 | 10K |
| R9 | 100 |
| R10 | 100K |
| R11 | 100K |
| R12 | 2K |
| R13 | 750 |
| C1 | 1uF |
| U1A-B | LM339 |
| Q1A | MPQ2222 |
| Q1B | MPQ2222 |
| Q1C | MPQ2222 |
| Q1D | MPQ2222 |
| Z1 | 7.2V |

Table For FIG. 3A

| | |
|---|---|
| R1 | 130 |
| R2 | 560 |
| R3 | 30K |
| R4A | 47K |
| R4B | 47K |
| R4C | 47K |
| R4D | 47K |
| R4E | 47K |
| R5A | 47K |
| R5B | 47K |
| R5D | 47K |
| R5E | 47K |
| R6A | 5.1K |
| R6C | 5.1K |
| R6D | 5.1K |
| R7 | 1M |
| R8 | 50K |
| R9 | 50K |
| C1 | 0.01uF |
| Z1 | IN52298 4.3V |
| Q1 | 2N2222 |
| Q2 | 2N2907 |
| Q3 | 2N2907 |
| Q4 | 2N2222 |
| Q5 | 2N2222 |
| Q6 | 2N2222 |
| Q7 | 2N2222 |
| U1 | LM741CN |
| U2A | LM393N |
| U2B | LM393N |
| J1-1 | Connector for Force Sensor |
| J1-2 | Connector for Force Sensor |

Table For FIG. 3B

| | |
|---|---|
| R101 | 360 |
| R102 | 3.0K |
| R103 | 30K |
| U3 | LM741 |

-continued

Table For FIG. 3B

| Z101 | 4.7V |
|------|------|
| Q101 | 2N2222 |

We claim:

1. An earring force tester for testing the spring force of clip-on type earrings, comprising a force sensitive member to which a spring loaded clip-on type earring can be mounted, and a detection circuit responsive to the force sensitive member for providing an indication of whether the spring force is within a range of acceptable spring force values.

2. The earring force tester of claim 1, wherein the detection circuit provides a visual output indicating whether the spring force is above, below or within the acceptable range.

3. The earring force tester of claim 1, wherein the force sensitive member outputs a signal having a characteristic indicative of the amount of force exerted by an earring, and wherein the detection circuit compares the signal characteristic to characteristics corresponding to the lower and upper boundary of the acceptable range.

4. The earring force tester of claim 1, wherein the detection circuit comprises means to adjust and calibrate the upper and lower boundaries of the range.

5. The earring force tester of claim 2, wherein the visual output comprises a first light which lights when the spring force is below the acceptable range, a second light when the spring force is above the acceptable range, and a third light when the spring force is within the acceptable range.

6. The earring force tester of claim 1, wherein the force sensitive member comprises a force sensor having two electrical leads, said force sensor having an impedance between the two leads which varies in dependence on the amount of force applied to the sensor.

7. The earring force tester of claim 3, wherein the detection circuit comprises:
a first comparator circuit for determining whether the spring force is above or below a lower boundary and for producing a first signal if the spring force is below a lower boundary and for producing a second signal if the spring force is above the lower boundary;
a second comparator circuit for determining whether the spring force is above or below an upper boundary and for producing a third signal if the spring force is above the upper boundary, and for producing a fourth signal if the spring force is below the upper boundary, said upper and lower boundaries being the boundaries of the range of acceptable spring force values; and
a signal circuit for producing a within-range signal, indicating that the spring force is within the acceptable range, in response to the second signal and the fourth signal.

8. The earring force tester of claim 7, wherein a first indication circuit produces a first visual indication in response to said second signal, wherein a second indication signal produces a second visual indication in response to said fourth signal, and wherein the within-range signal comprises a third visual indication signal.

9. The earring force tester of claim 8, wherein the first, second and third visual indication signals comprise different colored lights.

10. The earring force tester of claim 3, comprising a signal conditioning circuit between the force sensitive member and the detection circuit, said signal conditioning circuit comprising an amplifier whose gain varies in dependence on the amount of force applied to the force sensitive member, and wherein the amplifier outputs a voltage which varies substantially linearly with the amount of force applied.

11. A hand held, portable earring force tester for testing the spring force of clip-on type earrings, comprising a housing, a force sensitive member extending from said housing and providing a mounting surface onto which earrings can be mounted, and a circuit within the housing which detects the force from an earring mounted on the force sensitive member and provides a visual indication if the earring force is within an acceptable range of force.

12. The earring force tester of claim 11, wherein the circuit lights a first light if the earring force is within an acceptable range, wherein the circuit lights a second light if the earring force is below the acceptable range, and wherein the circuit lights a third light if the earring force is above the acceptable range.

13. The earring force tester of claim 11, wherein the circuit is powered by a battery.

14. The earring force tester of claim 13, wherein the circuit further comprises a battery voltage detector which lights a low voltage light when the battery voltage is below a certain voltage level.

15. The earring force tester of claim 10, further comprising means to adjust the lower and upper boundaries defining the acceptable range of force.

16. An earring tester for testing the spring force of clip-on type earrings, comprising a force sensitive member to which a spring loaded clip-on type earring can be mounted, a detection circuit responsive to the force sensitive member for providing an indication of whether the spring force is within a range of acceptable spring force values, wherein the force sensitive member outputs a signal having a characteristic indicative of the amount of force exerted by an earring, and wherein the detection circuit compares the signal characteristic to characteristics corresponding to the lower and upper boundary of the acceptable range, and wherein the detection circuit comprises:
a first comparator circuit for determining whether the spring force is above or below a lower boundary and for producing a first signal if the spring force is below a lower boundary and for producing a second signal if the spring force is above the lower boundary;
a second comparator circuit for determining whether the spring force is above or below an upper boundary and for producing a third signal if the spring force is above the upper boundary, and for producing a fourth signal if the spring force is below the upper boundary, said upper and lower boundaries being the boundaries of the range of acceptable spring force values; and a signal circuit for producing a within-range signal, indicating that the spring force is within the acceptable range, in response to the second signal and the fourth signal.

17. An earring force tester for testing the spring force of clip-on type earrings, comprising a force sensitive member to which a spring loaded clip-on type earring can be mounted, a detection circuit responsive to the force sensitive member for providing an indication of whether the spring force is within a range of acceptable spring force values, a signal conditioning circuit between the force sensitive member and the detection circuit, said signal conditioning circuit comprising an amplifier whose gain varies in dependence on the amount of force applied to the force sensitive member, and wherein the amplifier outputs a voltage which varies substantially linearly with the amount of force applied, wherein the force sensitive member outputs a signal having a characteristic indicative of the amount of force exerted by an earring, and wherein the detection circuit compares the signal characteristic to characteristics corresponding to the lower and upper boundary of the acceptable range.

* * * * *